United States Patent
Bark et al.

(10) Patent No.: US 6,445,917 B1
(45) Date of Patent: Sep. 3, 2002

(54) MOBILE STATION MEASUREMENTS WITH EVENT-BASED REPORTING

(75) Inventors: Gunnar Bark, Linköping; Joakim Bergström, Stockholm; Walter Müller, Upplands Väsby, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/314,019

(22) Filed: May 19, 1999

(51) Int. Cl.$^7$ .................................................. H04Q 7/34
(52) U.S. Cl. ..................... 455/423; 455/436; 455/437; 455/439; 455/522; 370/331; 370/332
(58) Field of Search ................................ 455/403, 423, 455/424, 425, 436, 437, 439, 453, 442, 522, 524, 525, 513, 512; 370/331, 332

(56) References Cited

U.S. PATENT DOCUMENTS

| | | | | |
|---|---|---|---|---|
| 5,241,685 A | * | 8/1993 | Bodin et al. ................. | 455/453 |
| 5,509,051 A | * | 4/1996 | Barnett et al. ............... | 455/443 |
| 5,640,414 A | | 6/1997 | Blakeney, II et al. | |
| 5,640,677 A | * | 6/1997 | Karlsson ...................... | 455/434 |
| 5,710,981 A | * | 1/1998 | Kim et al. ..................... | 455/69 |
| 5,754,945 A | * | 5/1998 | Lin et al. ..................... | 455/436 |
| 5,930,710 A | * | 7/1999 | Sawyer et al. ............... | 455/436 |
| 5,930,721 A | * | 7/1999 | Fried et al. .................. | 455/466 |
| 5,995,836 A | * | 11/1999 | Wijk et al. ................... | 455/436 |
| 6,047,183 A | * | 4/2000 | Kingdon et al. ............. | 342/450 |
| 6,061,337 A | * | 5/2000 | Light et al. .................. | 370/331 |
| 6,088,588 A | * | 7/2000 | Osborne ....................... | 455/425 |
| 6,151,508 A | * | 11/2000 | Kim et al. ..................... | 455/522 |
| 6,178,326 B1 | * | 1/2001 | Kalliokulju .................. | 455/337 |
| 6,289,009 B1 | * | 9/2001 | Sato ............................. | 370/342 |
| 6,330,459 B1 | * | 12/2001 | Crichton et al. ............. | 455/434 |

FOREIGN PATENT DOCUMENTS

| | | |
|---|---|---|
| WO | WO 98/43455 | 10/1998 |
| WO | WO 99/43177 | 8/1999 |
| WO | WO 99/43178 | 8/1999 |

* cited by examiner

*Primary Examiner*—William Trost
*Assistant Examiner*—Congvan Tran
(74) *Attorney, Agent, or Firm*—Nixon & Vanderhye PC (57) ABSTRACT

The present invention provides event-based or driven reporting of mobile station measurements. A mobile station measures one or more radio-related parameters for one or more cells in a radio access network. The mobile station evaluates the measured radio-related parameter with respect to a predetermined condition or event and determines that the predetermined condition is satisfied or that the event has occurred. Based on that evaluation, the mobile radio sends a report to the radio access network. Accordingly, the occurrence of an event and/or the satisfaction of a condition triggers the sending of the report to the network. That way, the network receives the information so that it can take timely and appropriate action without sending outdated or redundant measurement reports that do not convey relevant or new information.

74 Claims, 9 Drawing Sheets

MOBILE STATION MEASUREMENTS WITH EVENT-BASED REPORTING

FIELD OF THE INVENTION

The field of the invention is wireless communications. The present invention uses a mobile radio station as a measurement tool for a radio access network.

BACKGROUND AND SUMMARY OF THE INVENTION

In a typical cellular radio system, a geographical area is divided into cell areas served by base stations which are connected to a radio network. Each user (mobile subscriber) in the cellular radio system is provided with a portable, pocket, hand-held, or car-mounted mobile station which communicates voice and/or data with the mobile radio network. Each base station includes a plurality of channel units including a transmitter, a receiver, and a controller and may be equipped with an omnidirectional antenna for transmitting equally in all directions or with directional antennas, each directional antenna serving a particular sector cell. Each mobile station also includes a transmitter, a receiver, a controller, and a user interface and is identified by a specific mobile station identifier.

In a cellular radio communications system, a handover operation allows an established radio connection to continue when a mobile radio participating in that connection moves between cells in the system. Handover is typically initiated when the signal strength or signal quality of the radio connection with an origination base station falls below a predetermined threshold value. Often, a low signal strength or a poor signal quality indication means that the mobile station is near a border between the two cells. If the mobile station moves closer to a destination cell or to a clearer line of unobstructed sight, handover of the radio connection to the destination cell usually results in improved radio transmission and reception.

In some cellular systems, a handover operation requires physically breaking the connection with the origination cell and then reestablishing the connection with the destination cell, i.e., a "break-before-make" switching operation. Such hard handover techniques are typically employed in Time Division Multiple Access (TDMA) and Frequency Division Multiple Access (FDMA) type cellular systems. On the other hand, "soft" handover techniques may be employed in Code Division Multiple Access (CDMA) type cellular systems. CDMA is an increasingly popular type of access for cellular communications because a higher spectrum efficiency is achieved compared to FDMA and TDMA techniques which means that more cellular users and/or services can be supported. In addition, a common frequency band allows simultaneous communication between a mobile station and plural base stations. Signals occupying the common frequency band are discriminated at the receiving station through spread spectrum CDMA waveform properties based on the use of a high speed, pseudo-noise (PN) code. These high speed PN codes are used to modulate signals transmit from the base stations and the mobile stations. Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal.

In CDMA, therefore, a mobile station need not switch frequency when handoff of a connection is made from one cell to another. As a result, a destination cell can support a connection to a mobile station at the same time the origination cell continues to service the connection. Since the mobile station is always communicating through at least one cell during handover, there is no disruption to the call. Hence, the term "soft handover." In contrast to hard handover, soft handover is a "make-before-break" switching operation.

Deciding which cells to involve in handover often requires coordination between the mobile station and the radio network. The mobile station monitors base station control or broadcast channels from adjacent cells to determine if these cells are suitable handover candidates. When suitable cell candidates are identified, the mobile station notifies the radio network of this fact which then may initiate handover operations. Of course, other handover procedures may be employed.

Power control is also important in radio communications systems, and particularly so in third generation, wideband CDMA systems (WCDMA). Before transmitting over an "uplink" channel, a mobile station must set its transmission power level. Similarly, the radio access network must set base station transmit power on "downlink" channels, e.g., a paging channel, a forward access channel, traffic channels. While the actual power level set for mobile station and base station radio transmission and the interference levels that result therefrom are significant concerns in all mobile radio communications systems, such interference is particularly problematic in CDMA systems where large numbers of radio transmit and receive on the same frequency. If one station transmits at a power output that is too large, the interference it creates degrades the signal-to-interference ratio of signals received from other radio stations to the point that a receiving station cannot correctly demodulate transmissions from other radios. Another power related problem is the so-called "party effect." If a mobile transmits at too high of a power level, the other mobiles increase their respective power levels so that they can "be heard" thereby compounding an already serious interference problem.

In order to effectively manage handover, power control, and other important operations in a cellular radio communications network, the network should know the current status of the network. That status can be measured reasonably well by detecting the current values of various radio-related parameters at different locations in the network. In the handover example, the radio network should know which particular cells are appropriate candidates for handover for a particular mobile station connection. With respect to another example, i.e., controlling the interference levels in a particular cell, the radio network needs to know the transmit power levels of various radios in that cell, the received power levels, interference levels, etc. Other parameters may also be desirable for the network to monitor.

While these parameters could be measured by suitably located sensors or other monitoring equipment, the cost and installation of such equipment to make it effective and worthwhile would be prohibitive. On the other hand, the mobile stations themselves could be used (secondarily) as measurement tools to provide the radio network with important measurements reflecting the stations radio environment. Those measurements could then be used to facilitate radio network operations like handover, power control, resource management, etc.

The mobile radios could periodically provide measurement reports to the radio network for a standard set of radio-related parameters. The drawback, however, with periodic measurement reports is that if the period is too long, the reports may be outdated with the radio network responding too late or too slowly to changing conditions. On the other hand, if the reporting time period is reduced to improve the relevance of the information and appropriate responsiveness of the network to changing conditions, the amount of signaling from mobile stations increases significantly. This is disadvantageous for several reasons. First, the radio bandwidth is limited, and this kind of administrative signaling creates interference and reduces capacity for user communications. Second, much of the information that is transmitted in these frequent mobile station measurement reports will likely contain the same information as in recent reports. Third, frequent reporting also drains the mobile station's battery.

It is an object of the present invention to address the needs and overcome the problems identified above.

It is an object of the present invention to use mobile radio stations as flexible, general measurement tools for radio network control and optimization operations.

It is an object of the present invention to provide mobile station measurements in a timely, relevant fashion so that the radio network can promptly and effectively respond to changed conditions.

It is a further object of the present invention to provide the network measurement information in an efficient manner so that unnecessary measurement signaling between mobile and base station is reduced or otherwise minimized.

The present invention provides event-based or driven reporting of mobile station measurement. A mobile station measures a radio-related parameter for one or more cells in a radio access network. The mobile station evaluates the measured radio-related parameter with respect to a predetermined condition or event and determines that the predetermined condition is satisfied or that the event has occurred. Based on that evaluation, the mobile radio sends a report to the radio access network. Accordingly, the occurrence of an event and/or the satisfaction of a condition triggers the sending of the report to the network. That way the network receives the information so that it can take timely and appropriate action without sending outdated or redundant measurement reports that do not convey relevant or new measurement information.

The measurement report may identify the cell for which the mobile measurement was made, the specific triggering measurement event, the measured value of the radio-related parameter, and/or other information. The radio-related parameter may be qualitative and/or quantitative. Example parameters include signal strength, signal power, an interference level, signal-to-interference ratio, error rate, traffic volume, etc. associated with the one or more cells. Hysteresis is an additional factor that may be employed in determining whether a predetermined condition or event has occurred. A time to trigger interval may also be employed by the mobile radio in determining whether a predetermined condition is satisfied or an to event has occurred. A radio-related parameter can be evaluated with respect to two or more predetermined conditions or events with a report being sent if one or if both of the conditions are satisfied.

An example predetermined condition or event may correspond to the measured radio-related parameter moving into or moving out of a predetermined parameter range. Another example is the measured radio-related parameter for a first cell becoming better than the measured radio-related parameter for a second cell. A positive or negative offset value may be added to the measured radio-related parameter as a further required condition associated with the occurrence of an event before the measurement report is sent. That offset may vary depending on the cell. The predetermined condition or event may include a change in the measured radio-related parameter exceeding a change threshold, detection of a problem on a radio link with one of the cells, a transmit power of the mobile station crossing a threshold value, the mobile station failing to increase or decrease its transmit power on demand, and the mobile station receiver becoming saturated.

A control node in the mobile radio network instructs a mobile station to measure one or more radio-related parameters for one or more cells and to evaluate each measured radio-related parameter for each of the one or more cells with respect to a predetermined event and/or condition. The mobile station is instructed to send a report to the control node when such an event occurs. Then when the report is received from a mobile station, the controller determines whether to perform an operation based on the received report. Example operations include handover, power control, channel type switching, operation and maintenance, network balancing, network optimization, etc.

The control node provides the mobile station measurement instruction using a measurement control message that preferably includes one or more general type parameters. For example, the measurement control messages simply specify the one or more parameter measurements the mobile station is to make, identify the one or more events that can trigger a report, and what information the report should include. Because the mobile station measurements and the events are not coupled to a particular network operation or network evaluation, there is a great deal of flexibility and adaptability for future network needs and operations. In this regard, subsequent measurement control messages may modify the radio-related parameter, the predetermined event, add additional parameters to be measured, or specify other predetermined events to be evaluated. In fact, the mobile station may be instructed not to send a report even though a predetermined condition is satisfied.

BRIEF DESCRIPTION OF THE DRAWINGS

The foregoing and other objects, features, and advantages of the invention will be apparent from the following description of preferred embodiments as well as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. While various example parameters, events, conditions, and network operations are described in conjunction with the following description, the present invention is not limited to a particular measurement, event, condition, or network operation. In other instances, detailed descriptions of well-known methods, interfaces, devices, and signaling techniques are omitted so as not to obscure the description of the present invention with unnecessary detail.

Figure 1A:
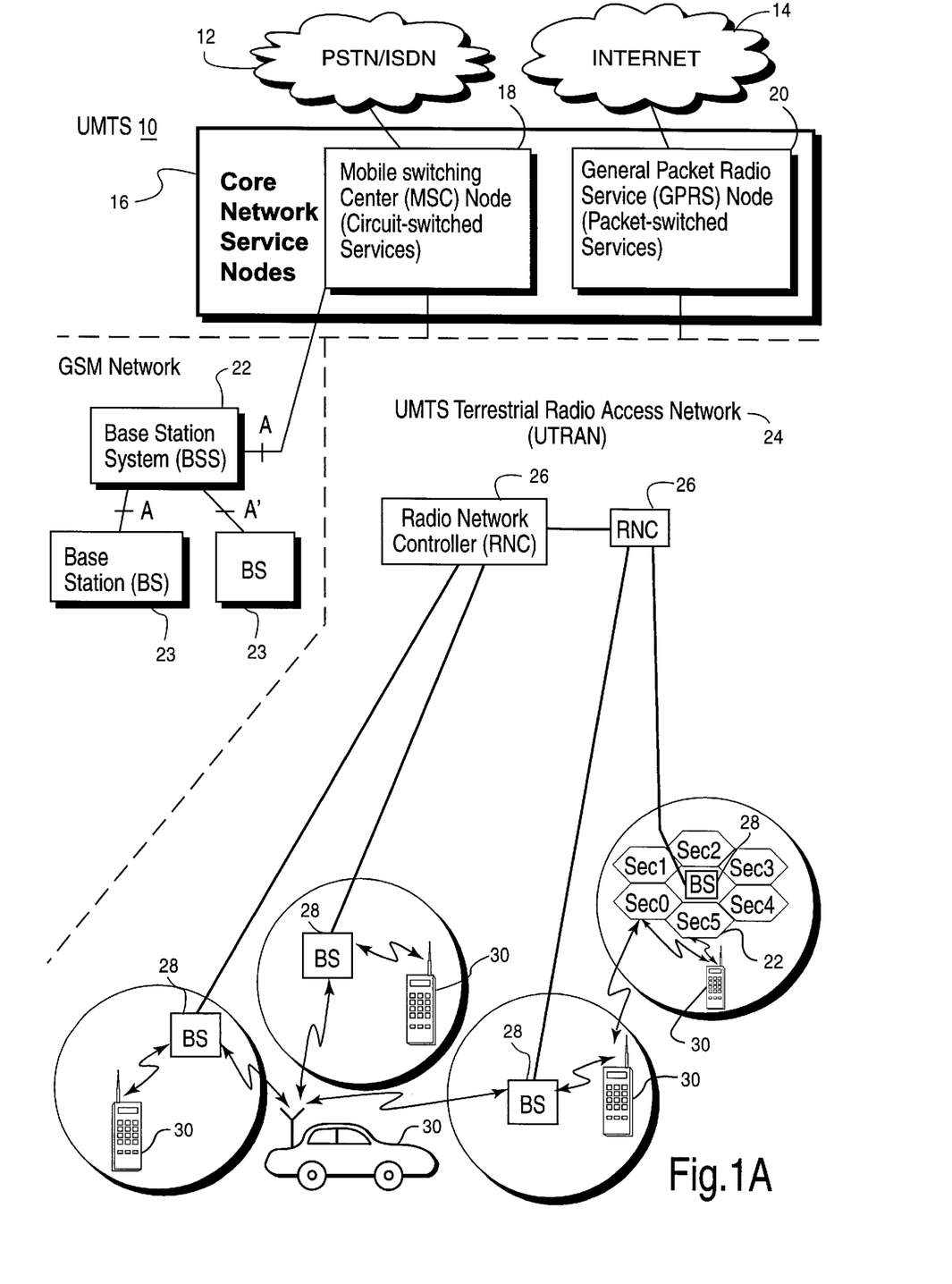
FIG. 1A is diagram of example mobile communications system in which the present invention may be advantageously employed.

The present invention is described in the non-limiting, example context of a universal mobile telecommunications (UMTS) 10 shown in FIG. 1A. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to corresponding service nodes 16. The PSTN/ISDN connection-oriented network 12 is connected to a connection-oriented service node shown as a Mobile Switching Center (MSC) node 18 that provides circuit-switched services. In an existing GSM network, the MSC 18 is connected over an interface A to a Base Station Subsystem (BSS) 22 which in turn is connected to radio base station 23 over interface A'. The Internet connectionless-oriented network 14 is connected to a General Packet Radio Service (GPRS) node 20 tailored to provide packet-switched type services which is sometimes referred to as the serving GPRS service node (SGSN). Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers 26. Each RNC 26 is connected to a plurality of base stations (BS) 28 and to any other RNCs in the URAN 24.

Preferably, radio access is based upon wideband, Code Division Multiple Access (WCDMA) with individual radio channels allocated using CDMA spreading codes. Of course, other access methods may be employed. WCDMA provide wide bandwidth for multimedia services and other high transmission demands as well as robust features like diversity handoff and RAKE receivers to ensure high quality. Each mobile station 30 is assigned its own scrambling code in order for a base station 28 to identify transmissions from that particular mobile station as well as for the mobile station to identify transmissions from the base station intended for that mobile station from all of the other transmissions and noise present in the same area.

Different types of control channels may exist between one of the base stations 28 and mobile stations 30. For example, in the forward or downlink direction, there are several types of broadcast channels including a general broadcast channel (BCH), a paging channel (PCH), and a forward access channel (FACH) for providing various other types of control messages to mobile stations. In the reverse or uplink direction, a random access channel (RACH) is employed by mobile stations whenever access is desired to perform location registration, call origination, page response, and other types of access operations. Traffic channels (TCH) may be allocated to carry substantive call communications with a mobile station.

As shown in FIG. 1A, some mobile stations may communicate with only one base station. However, a mobile station may be communicating with plural base stations or plural base station sectors, e.g., soft handover. Even when idle, mobile stations monitor or scan the control channel broadcasts from neighboring base stations.

Figure 1B:
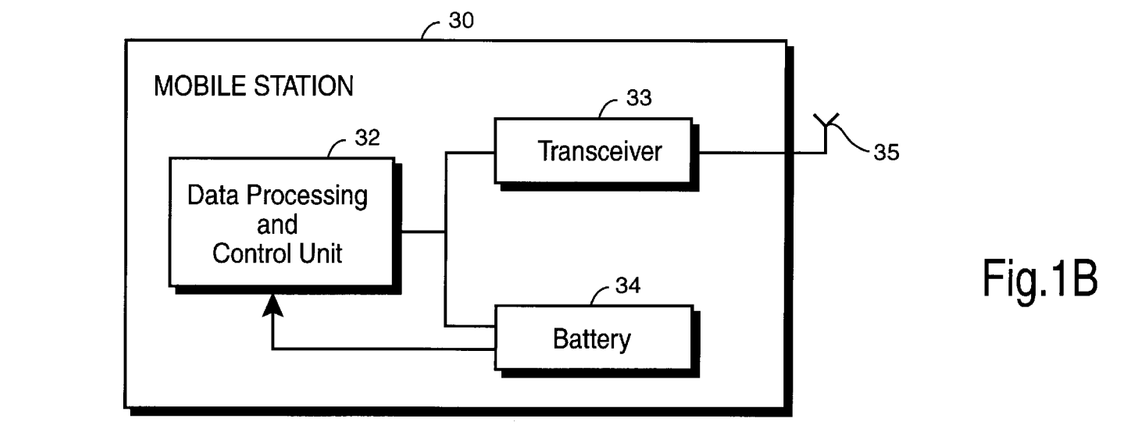
FIG. 1B is a simplified function block diagram of a mobile station shown in FIG. 1A.
Figure 1C:
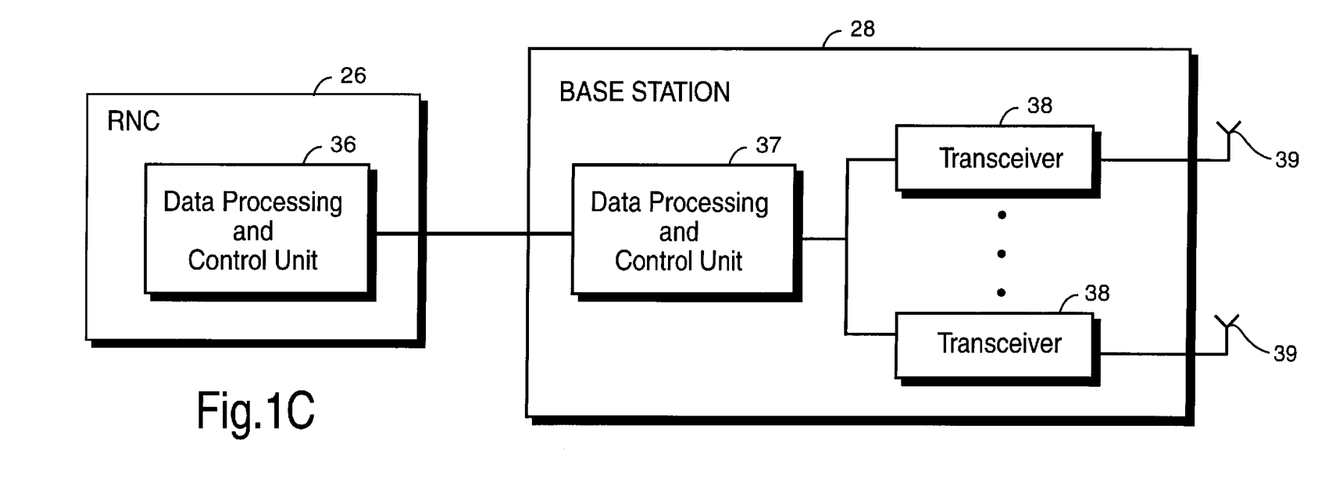
FIG. 1C is a simplified function block diagram of a radio network controller and a base station shown in FIG. 1A.

The mobile station 30 shown in FIG. 1B includes a data processing and control unit 32 for controlling various operations required by the mobile station. The mobile's data processing and control unit 32 provides control signals as well as data to a radio transceiver 33 connected to an antenna 35. Both the data processing and control unit 32 and transceiver 33 are powered by battery 34. The amount of power supplied by the battery 34 to the data processing and control unit 32 and transceiver 33 is regulated by one or more control signals from the data processing and control unit 32. The radio network controller 26 and base station 28 shown in FIG. 1C are radio network nodes that each include a corresponding data processing and control unit 36 and 37, respectively, for performing numerous radio and data processing operations required to conduct communications between the RNC 26 and the mobile stations 30. Part of the equipment controlled by the base station data processing and control unit 37 includes plural radio transceivers 38 connected to one or more antennas 39.

In the present invention, mobile stations may be employed to provide measurement reports so that the UTRAN receives real-time knowledge of the network conditions based on one or more parameters measured by the mobile stations. While it is preferable to have many mobile stations generate and send measurement reports to give the UTRAN significant amounts of measurement data from different locations in the network, the invention can be implemented using just a few mobile stations or even just one mobile station. The sending of a measurement report is event triggered. Consequently, real-time knowledge of network conditions can be selectively conveyed at relevant moments so the UTRAN can effectively respond without delay and without excessive signaling overhead. An adaptive set of predetermined "events" and/or predetermined "conditions" may be defined that trigger measurement reports to be sent from the mobile station. Once the report is received, the UTRAN may then analyze the reported information and perform, if necessary, responsive or other desirable operations like handover, power control, operations and maintenance, network optimization, and other procedures.

Figure 2:
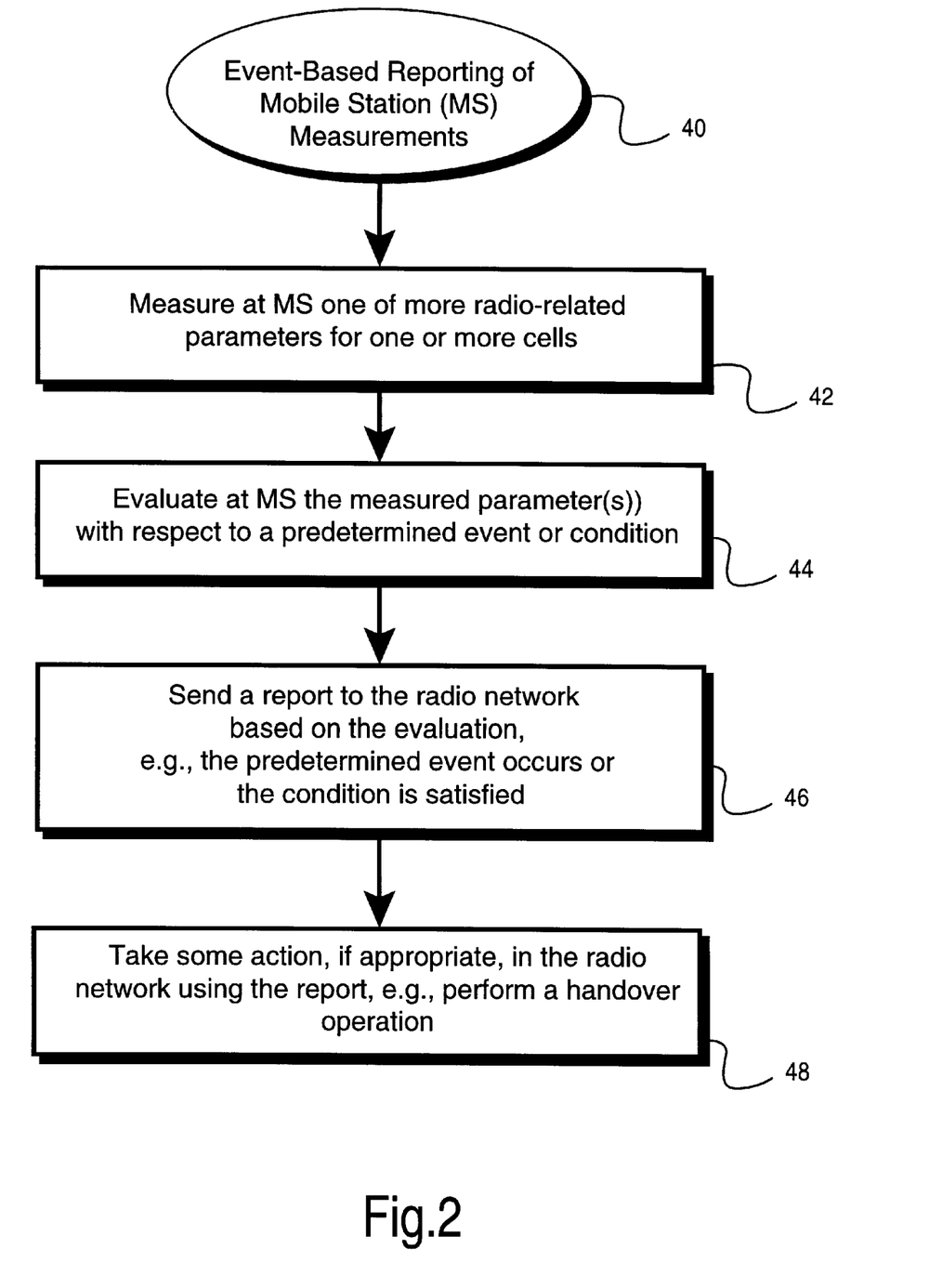
FIG. 2 is a function block diagram outlining general procedures for event-based reporting of mobile station measurements.

FIG. 2 outlines in flowchart format example procedures for event-based reporting of mobile station measurements (block 40). The mobile station measures one or more radio-related parameters for one or more cells (block 42). One non-limiting example parameter is the received signal strength of base station broadcast channel signals from current and neighboring cells. The mobile station evaluates each measured parameter with respect to a predetermined event or condition (block 44). Based on that evaluation, e.g., the predetermined event occurs and/or the predetermined condition is satisfied, the mobile station sends a report to the radio network (block 46). The contents of that report may include more or less information as established by the radio network operator. For example, the report may simply contain the identification of the cell and identification of the event that occurred. Other information such as the value of the measured parameter, other parameters, and even optional information may also be provided in that report. In response to the received report, the radio network may take some action, if appropriate, using the report including performing the example operations noted above, handover, power control, channel type switching (e.g., switching from a dedicated to a common channel and vice versa), etc. (block 48).

Preferably, measured parameters and predetermined events and/or conditions are defined in general terms so that they are not tightly coupled to a particular operation, evaluation, or algorithm. This allows flexibility and adaptability for other event-triggered mobile station reports. On the other hand, the measurement and reporting parameters and events may be made specific for a particular application or need. Although event-triggered reporting is preferable, the mobile station may be instructed by the UTRAN to send periodical or other types of non-event-triggered reports if desired. Periodical reporting may be preferred for network supervision reasons if the real-time behavior or specific mobile station measurements is less important than the total overall system behavior. The present invention flexibly allows for only a fraction of mobile stations to perform such network supervision using mobile measurements from selected cells during a selected time period.

Figure 3:
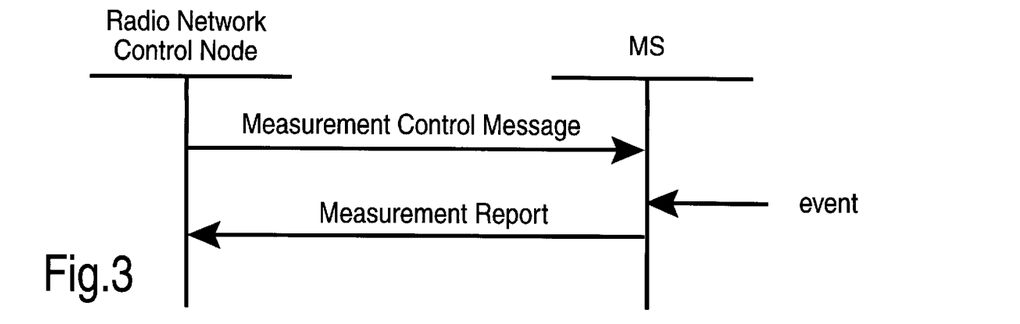
FIG. 3 is a diagram illustrating measurement related messages between a radio network control node and a mobile station.

FIG. 3 illustrates an example signaling diagram useful in implementing one aspect of the invention. A radio network control node, e.g., the RNC, a base station, or other controller, generates and transmits a Measurement Control Message for a mobile station. In general, the measurement control message instructs the mobile station to measure one or more radio-related (or other) parameters that can be measured by the mobile station. The message also identifies one or more predetermined events and/or conditions which trigger the transmission of a measurement report sent from the mobile station back to the radio network control node. Examples of information that may be included in the measurement control message include:

measurement parameter: identifies what the mobile station should measure measurement event and/or condition: identifies triggering event and/or condition measurement identity number: used by the UTRAN in subsequent modification of mobile station measurement and by the mobile station in the measurement report commands: used to set up a new measurement, modify a previously specified measurement parameter, modify a predetermined event or condition, stop measurement, clear all information stored in the mobile related to a measurement optional parameters: parameters that a network operator is interested in but which may not be time sensitive Qualitative and/or quantitative parameters may be specified and measured. Non-limiting example parameters include measured signal strength, signal power, bit error rate, signal-to-interference ratio, path loss, traffic volume, timing/synchronization offsets, etc. Example predetermined events and/or conditions will be described below in conjunction with FIGS. 6–15.

Figure 4:
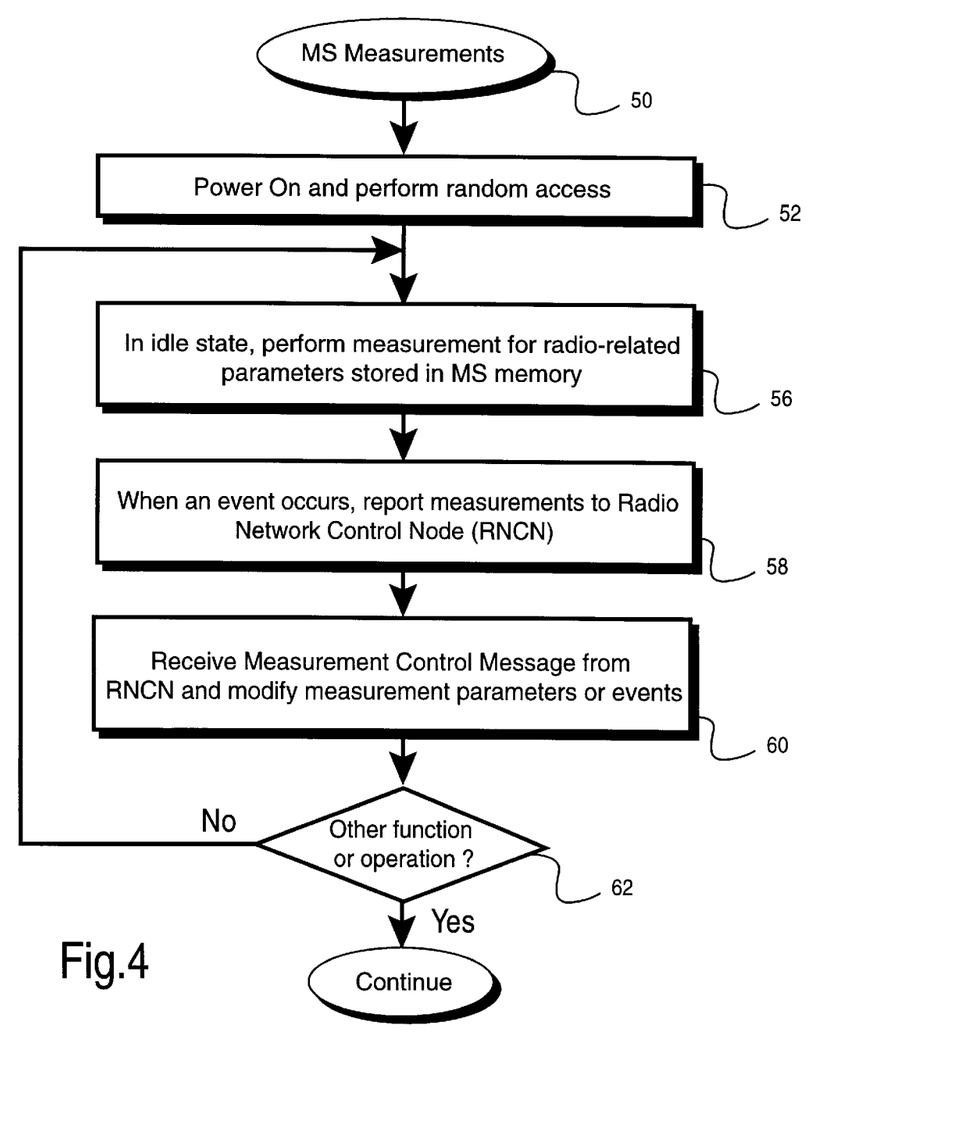
FIG. 4 is a flowchart illustrating example mobile station measurement and reporting procedures.

The operation of a mobile station in an example measurement mode is described in conjunction with the example mobile station measurement routine (block 50) shown in function block format in FIG. 4. The mobile station initially powers on and performs a random access with the radio network (block 52). While the mobile station is in an idle state, it may perform one or more measurements of radio-related or other parameters identified in an earlier-received measurement control message and stored in the mobile station (block 54). For example, the idle mobile station monitors broadcast or other control channel(s) to measure received signal strength if received signal strength is the parameter that was previously identified in the measurement control message. When a predetermined event or other predetermined condition occurs that was stored in the mobile station, the mobile station generates and transmits a measurement report to the radio network control node as specified by the previously received measurement control message (block 56). Thereafter, the mobile station may receive another measurement control message from the radio network control node that modifies measurement parameters or events (block 60). The mobile station modifies the stored parameters or events as instructed and determines whether other functions or operations need to be performed such as responding to a page, registering with the network, originating a call, power off, etc. (block 62). If so, such function is performed; otherwise, the mobile station performs measurements and sends event-based reports in accordance with the information stored in the mobile radio as described.

Figure 5:
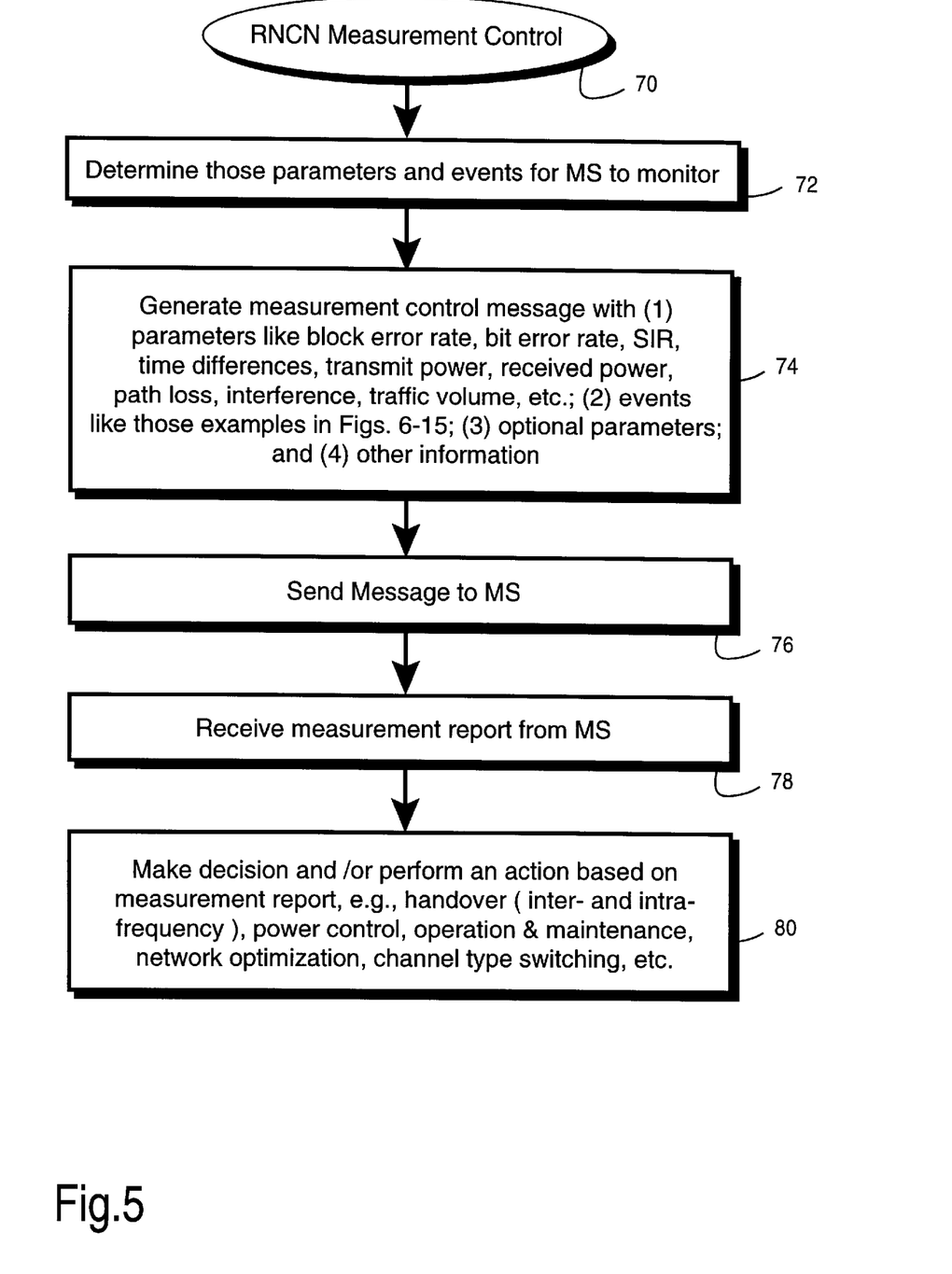
FIG. 5 is a flowchart diagram illustrating example procedures of a radio network control node measurement control routine.

FIG. 5 is a flowchart diagram of example radio network control node (RNCN) measurement control procedures (block 70) that may be employed in a radio network control node in accordance with an example embodiment of the present invention. The radio network control node, as programmed by the radio network operator, determines those parameters, events and/or conditions a mobile station is to monitor and report (block 72). The control node generates a measurement control message that includes:

(1) one or more parameters to measure, e.g., block error rate, bit error rate, signal interference ratio, synchronization/time differences, transmit power, receive power, path loss, interference, traffic volume, etc.;

(2) events and/or conditions like those example events illustrated in FIGS. 6–15;

(3) optional parameters; and (4) other information (block 74).

The control node then sends the measurement control message to one or more mobile stations (block 76). When events have occurred that trigger the transmission of a measurement report, the control node receives the measurement report from the mobile station (block 78). The control node then makes a decision whether or not to perform an action based upon the information provided in the report including for example handover (both inter- and intra-frequency), power control, channel type switching, operations and maintenance, network optimization, etc. (block 80).

FIGS. 6–15 give examples of events and/or conditions that may be useful to trigger the generation and transmission of a measurement report to the radio network control node. Although the occurrence of an event may be viewed as the meeting of a condition (and vice versa), an event may also be coupled with a further condition before a report is sent. It should be understood that the terms "event" or condition, when used alone, should be broadly interpreted to include any predetermined occurrence or state that causes the mobile station to send a measurement report.

Figure 6:
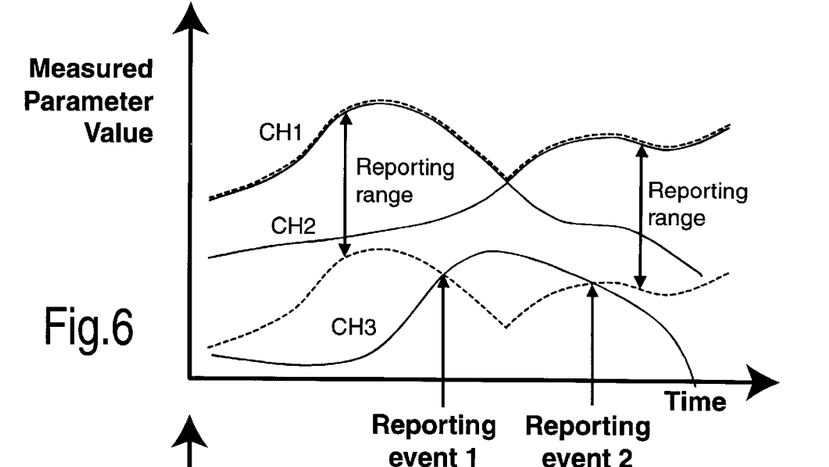
FIGS. 6–15 are graphs illustrating example events, and in some instances, other conditions or factors associated with an event trigger the sending of a mobile station measurement report.

FIG. 6 illustrates several graphs representing a mobile station measured parameter value against time for several radio channels generally indicated as CH1, CH2, and CH3. Such a radio channel transmission is typically broadcast from a base station cell, received by the mobile station, and evaluated to determine a characteristic or parameter, e.g., signal strength, signal quality, etc. Non-limiting examples of such radio channels include a control channel, a pilot channel, a perch channel, or a broadcast channel. In the UTRAN specifically, such a radio channel could be the primary common control physical channel (PCCPCH). A reporting range is defined relative to the current, "best" channel (at least in at terms of the measured parameter value), and is defined in the measurement control message received from the radio network control node. Here the term "best" corresponds to the channel having the greatest measured parameter value. If a monitored radio channel such as CH3 enters the reporting range (reporting event 1) or leaves the reporting range (reporting event 2), the mobile station generates and transmits a measurement report. The report may simply indicate, for example, that a CH3 has entered or exited the reporting range.

Figure 7:
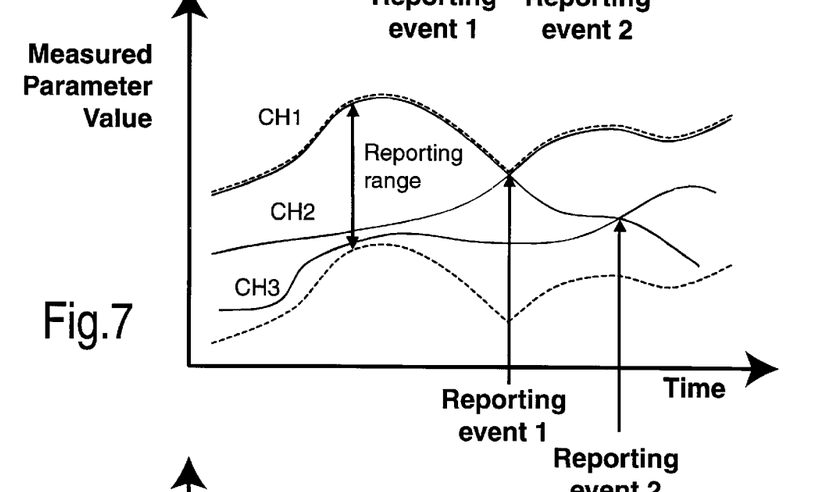

FIG. 7 illustrates another example event. A reporting event is indicated when the measured parameter values for two monitored radio channels intersect or cross each other within the reporting range. Reporting event 1 occurs when radio channels CH1 and CH2 intersect. Reporting event 2 occurs when radio channels CH1 and CH3 intersect. The report may simply indicate, for example, which channels intersected.

Figure 8:
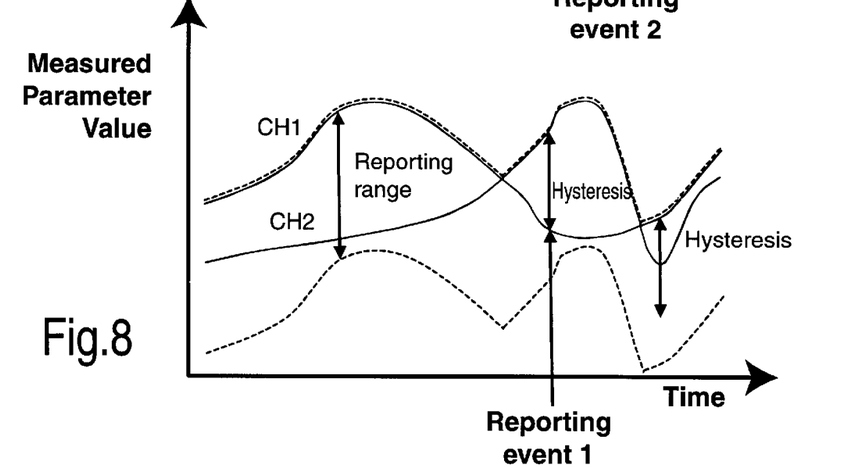
Figure 9:
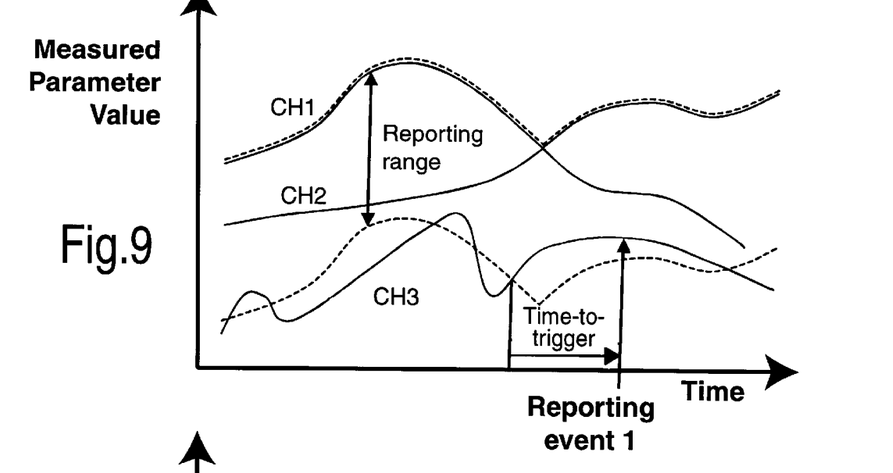

FIG. 8 illustrates an example of a predetermined condition that must occur along with an event before a report event is sent. To eliminate the volume of event triggered reports, a hysteresis amount may be associated with an event. As shown in the example of FIG. 8, although the measured parameter value for channel CH2 exceeds that of channel CH1, a reporting event is not triggered until the difference between the measured parameter values for channels CH1 and CH2 reaches a particular amount corresponding to the hysteresis. Note that when the value for the radio channel CH2 crosses below the parameter value waveform for radio channel CH1, a reporting event is not triggered because the parameter value for radio channel CH2 does not reach the hysteresis amount.

Similarly, a time-to-trigger condition may be employed to limit the number of event-triggered reports, and ultimately, the signaling load. A time-to-trigger condition may be associated with an event such that the report is triggered only after the condition(s) satisfying the event exist(s) for the specified time-to-trigger. In the example in FIG. 9, the effect of the time-to-trigger is that the event where radio channel CH3 enters the reporting range is not reported until radio channel CH3 has been in that range for the time-to-trigger interval. Hysteresis and time-to-trigger may be set individually per reporting event or generally as specified in the measurement control message. Hysteresis, and time-to-trigger, and similar conditions allow the UTRAN to balance/tradeoff the amount of measurement signaling and the promptness with which radio environmental conditions are communicated to the network.

Individual radio channels being monitored may also be associated with an offset. The offset may be positive or negative and is added to the measured parameter value before the mobile station determines whether an event has occurred. In the example illustrated in FIG. 10, a report would be sent without an offset when a channel enters or leaves the reporting range. However, since a positive offset is specified for radio channel CH3, it is the dotted offset curve that is employed to determine if an event occurs.

Figure 10:
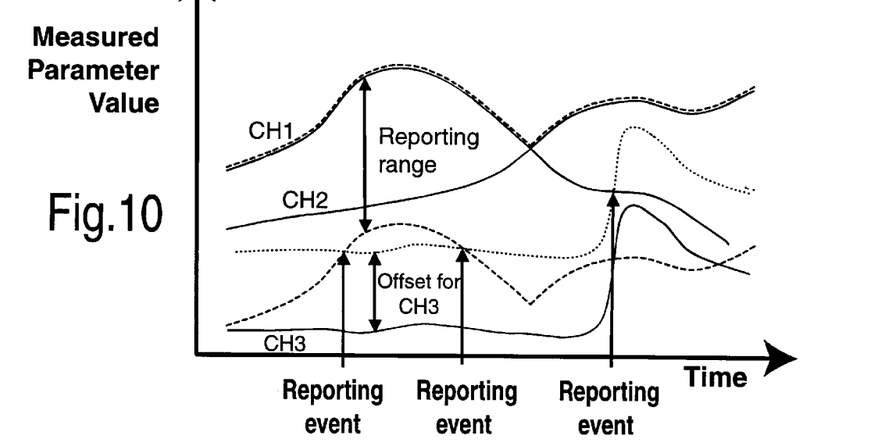

Measurement reports from the mobile station to the radio network are triggered when the measured parameter value for radio channel CH3 plus its associated offset either enters or leaves the reporting range and/or when its measured parameter value exceeds, for example, the "best" current radio channel CH1.

This offset mechanism allows the radio network to change the reporting for an individual channel. By applying a positive offset, the mobile station sends measurement reports under an assumption that the offset channel has a higher measured parameter value than is actually the case. Such a positive offset mechanism might be useful if the network operator knows that a specific cell should be monitored more carefully. For example, the network operator may know from experience that this radio channel often becomes an excellent candidate quite quickly, e.g., due to street corners, and therefore is appropriate for more intensive reporting. In the handover context, channel CH3 might be included in an active candidate set of handover channels than otherwise or would not have been the case without the positive offset. Alternatively, the network operator might choose to apply a negative offset to a particular channel with the result that the corresponding cell is more likely to be excluded from the active handover candidate set.

An individual cell offset may also be employed as a tool to "move" the cell border. By applying a positive offset to a specific cell, the effect may be that mobile stations will connect to that cell at a longer distance than otherwise. Here the offset is added before triggering events occur as opposed to offsets that might be applied by the radio network. If offsets are applied only in the network, the measurement report may be triggered too late in order for the network to take appropriate action. Therefore, an offset applied in the mobile station at the moment of event evaluation is more beneficial. One result of this is that the network operator can perform load sharing between the cells in an area, i.e., divide the total traffic load equally between the cells by adapting the size of the cells.

If downlink path loss is used as a measured parameter, the radio network may optionally include a filtered value of the uplink interference along with each cell's offset. In this situation, two handover criteria—downlink path loss plus uplink interference—may be used to optimize handover evaluation with respect to the system's uplink performance by considering the uplink interference when evaluating candidate handover.

Figure 11:
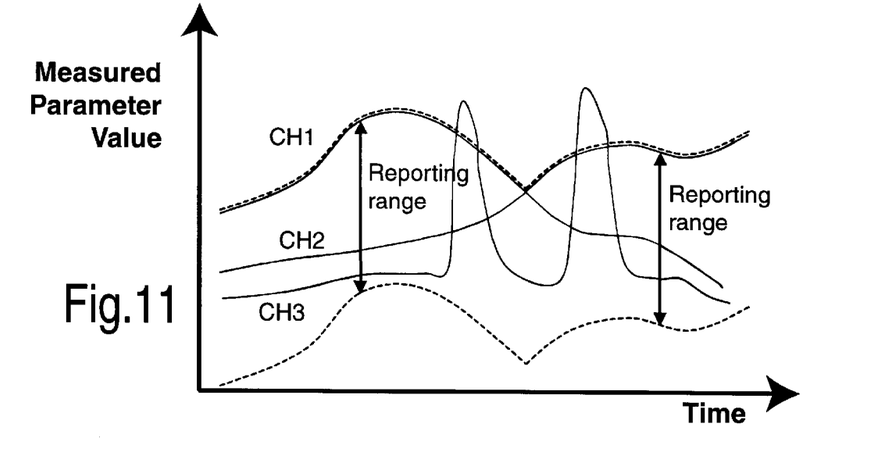

Another consideration that might be employed is now considered in conjunction with FIG. 11. For the examples given above, the reporting range is defined relative to the "best" measured channel. There may be situations where it is desirable to prevent a specific channel from affecting the reporting range. FIG. 11 shows an example where the radio network instructs the mobile station to not allow channel CH3 to affect the reporting range. This mechanism may be useful if the operator knows from experience that the quality of channel CH3 is unstable in a specific area and therefore should not be used to change the reporting range. However, it is still possible for the entry or departure of channel CH3 of the reporting range be reported as an event. In addition, the radio network control node may instruct the mobile radio to not report a particular event that would previously have caused a report to be transmitted.

An "event" may also include the occurrence of certain plural events. Examples of such a combined event includes:
 a channel leaving the reporting range coupled with a channel measured parameter value being above/below an absolute threshold when one channel becomes better than another channel with at least one of the two channels being in an active candidate handover set a channel deteriorates very rapidly and only one channel is better than the rapidly deteriorated channel only one channel is currently in the active handover candidate set and that channel deteriorates very quickly or is below an absolute threshold, e.g., the mobile station is moving out of coverage and an immediate search for another system should be started.

Figure 12:
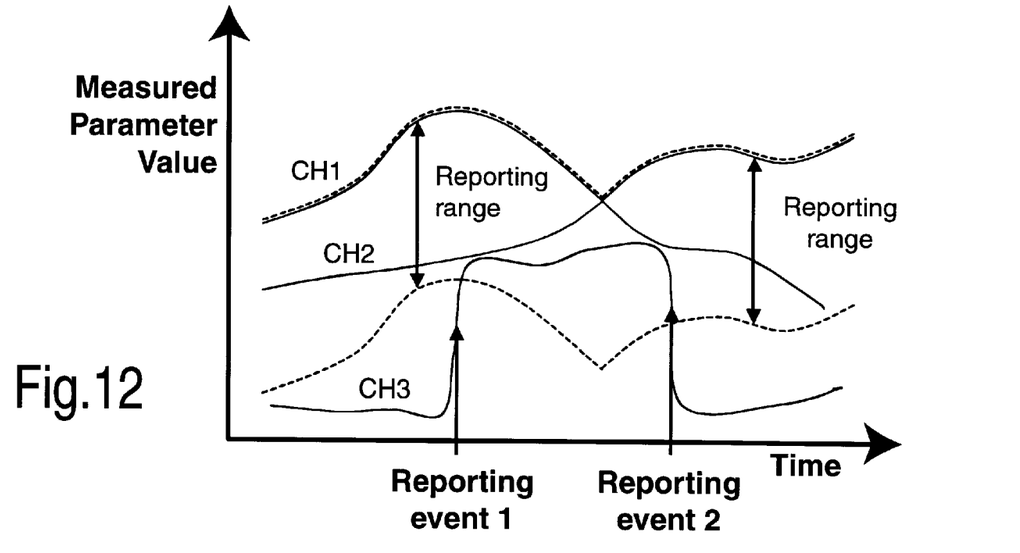

Another example event is now described in conjunction with FIG. 12. Here the event is defined based on how quickly the measured parameter value for a channel changes. In this example, the measured parameter value for channel CH3 changes quite rapidly in a positive fashion for reporting event 1 and in a negative fashion for reporting event 2. Such an event may also be reported even if it occurs outside the reporting range. The threshold value for the parameter change or slope is provided to the mobile station in the measurement control message.

Many of the above examples may be useful to the radio network in making handover decisions and performing handover operations (although they are not limited to such decisions/operations). The mobile station may also provide the radio network with information regarding certain radio link problems. For example, there might be poor synchronization or timing on a radio link. When this occurs, the mobile station can inform the radio network, and the network operator might remove the radio link from an active candidate set and initiate a possible maintenance investigation.

Another important monitoring and control area for the radio network is that of power control. Example events that might be useful for power control operations are now described in conjunction with FIGS. 13–15.

Figure 13:
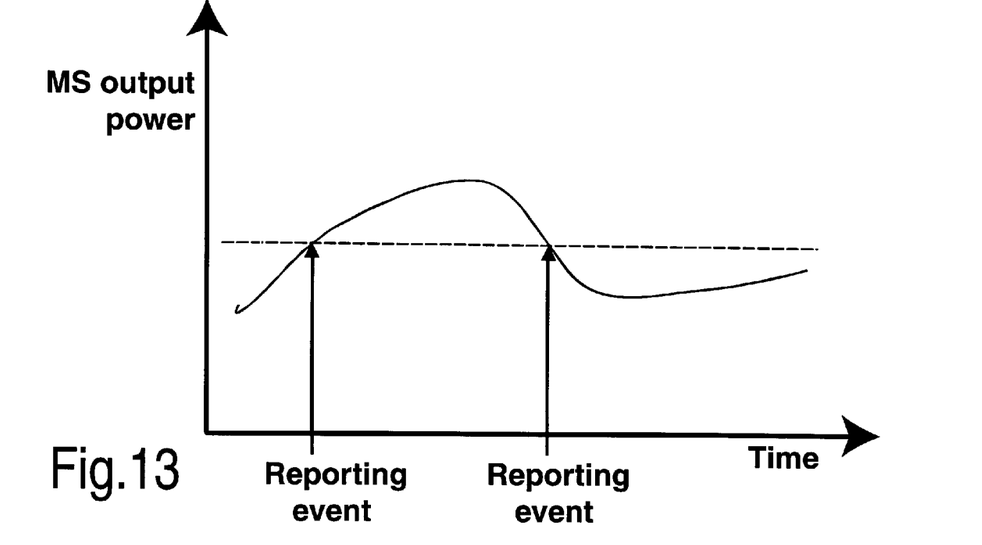

In FIG. 13, mobile station output power is plotted against time. A reporting event corresponds to the transmit power of the mobile station becoming larger than or less than an absolute mobile station output power threshold shown as a dashed line. Reporting that the transmit power becomes larger than a threshold may be useful in detecting a coverage problem, e.g., high transmit power employed by the mobile station due to high path loss. Reporting that the transmit power is below a threshold may be useful in detecting a near-far problem, i.e., that very low power is used by the mobile station due to very low radio link path loss. This could become a problem if the mobile station moves even closer to the base station and cannot decrease its power. The risk is then that the base station will receive the mobile signal with too much power thereby deteriorating reception of other mobile station transmissions.

There are practical limits for the output power of the mobile station either imposed by the network or due to physical limitations of the mobile terminal. For example, adjusting the transmit power levels of all mobile transmitted signals so they are received at a base station with the same signal-to-interference ratio is important for attaining maximum capacity in a CDMA system. If the mobile station is unable to decrease its power, the mobile station causes undue disturbance to all other mobile communications in the cell, oftentimes leading to other mobile stations increasing their power to compensate for the increased disturbance level. Eventually, one or more mobile stations will reach a maximum but nevertheless insufficient power level to be "heard" over the interference, and the network will start dropping calls to decrease the interference. If a mobile station is having difficulty adjusting its power, for whatever reason, the radio network may not necessarily know immediately of this difficulty. It is therefore advantageous that the network receive a prompt warning from the mobile station of such a condition and take appropriate action, e.g., handover to another cell or frequency.

Figures 14, 15:
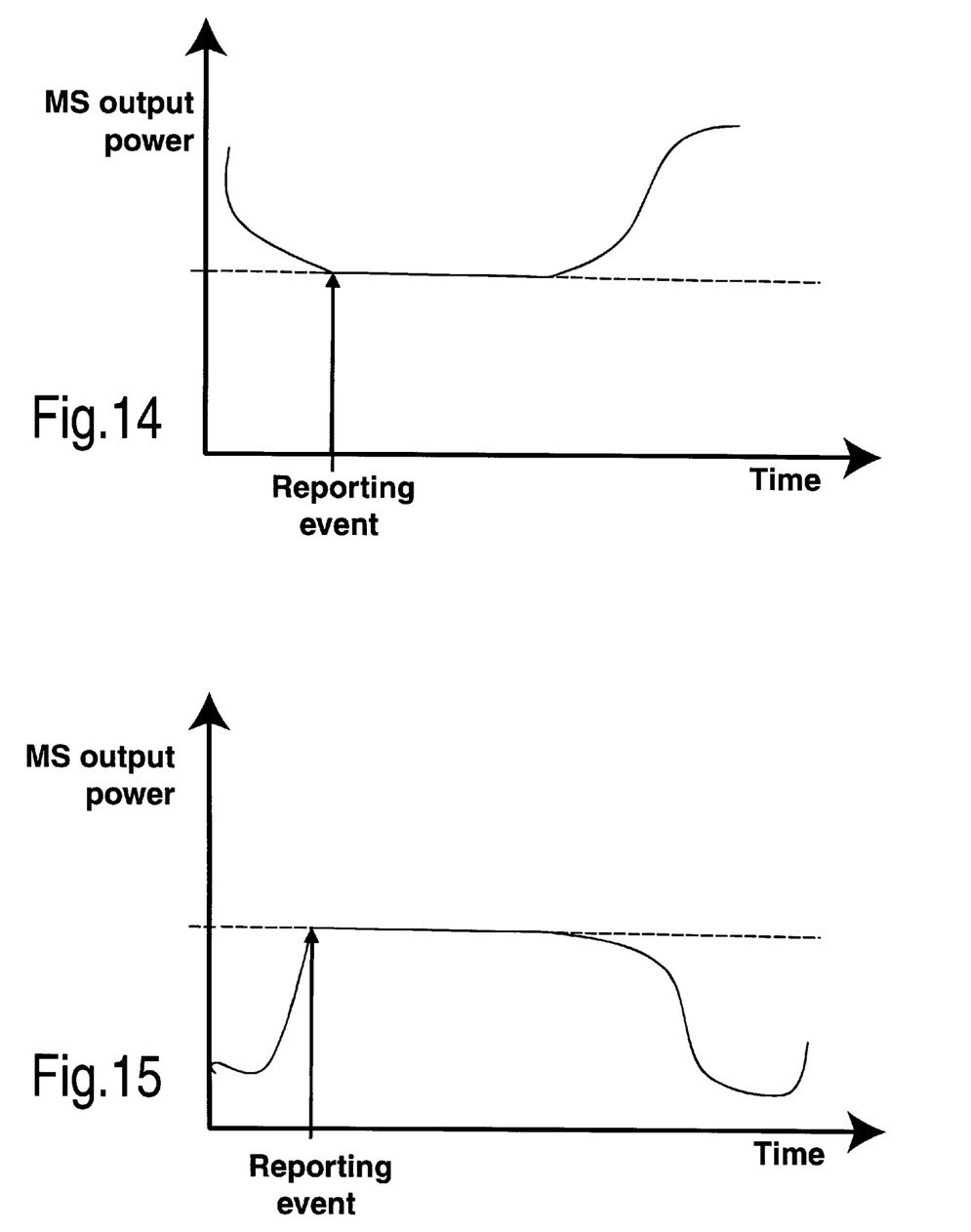

FIG. 14 illustrates the situation where the mobile station cannot decrease its output power below a certain value (the dashed line), and FIG. 15 illustrates the opposite condition. If the mobile station has difficulty adjusting its power during the power control interval, e.g., 0.625 milliseconds, it is still beneficial for the network to get an early warning from the mobile station about such a condition so it can take appropriate actions, e.g., change the bit rate at which the mobile transmits.

Both base station and mobile station transceivers have a limited dynamic range. If the signal received by the mobile station exceeds the dynamic range, the receiver becomes saturated, deteriorating signal reception quality. Using such receiver saturation as a triggering event, the mobile station can inform the network about this particular problem.

While the events shown in FIGS. 13–15 may be employed to support uplink and downlink power control functions in the radio network, this information could also be used to support other operations. For example, if the mobile station cannot decrease its transmit power upon demand from the radio network, e.g., it is too close to a base station, the network may order the mobile station to do an interfrequency handover.

While the present invention has been described with respect to a particular embodiment, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention. Accordingly, it is intended that the invention be limited only by the scope of the claims appended hereto.

What is claimed is:

1. A mobile radio, for use in a mobile radio communications system including plural mobile stations communicating with a radio access network having plural cell areas, electronically enabled to perform the following operations including:

measure a radio-related parameter for one or more cells;

add either a positive or a negative offset to the measured radio-related parameter;

evaluate the offset, measured radio-related parameter for the one or more cells with respect to a predetermined condition and determine that the predetermined condition is satisfied; and report to the radio access network the determination for purposes of handover control or power control.

2. The mobile radio in claim 1, wherein the report includes a measured value of the radio-related parameter.

3. The mobile radio in claim 1, wherein the radio-related parameter is a signal strength, a power, or signal-to-interference ratio of a signal received from a cell base station.

4. The mobile radio in claim 1, wherein the radio-related parameter is an interference level or an error rate associated with a signal received from a cell base station.

5. The mobile radio in claim 1, wherein the measuring includes measuring signals transmitted over different base station radio channels at the same frequency.

6. The mobile radio in claim 1, wherein the measuring includes measuring signals transmitted over different base station radio channels at different frequencies.

7. The mobile radio in claim 1, further electronically enabled to:
   receive a measurement control message from a control node in the radio access network, and
   modify the radio-related parameter or the predetermined condition in response to the received message.

8. The mobile radio in claim 1, further electronically enabled to:
   receive a measurement control message from a control node in the radio access network, and
   add another radio-related parameter to be measured or another predetermined condition to be evaluated in response to the received message.

9. The mobile radio in claim 1, further electronically enabled to:
   establish a reporting range for the predetermined condition, and
   send a report when the measured radio-related parameter enters or leave the reporting range.

10. The mobile radio in claim 1, further electronically enabled to:
    establish a reporting range for the predetermined condition, and
    send a report when the measured radio-related parameter for a first cell is the same as or close to the measured radio-related parameter for a second cell.

11. The mobile radio in claim 1, wherein the positive or negative offset may vary depending on the cell.

12. The mobile radio in claim 1, wherein plural radio-related parameters are each measured and evaluated against a corresponding predetermined condition, the mobile radio further electronically enabled to:
    add a corresponding, parameter-specific offset to each measured radio-related parameter before evaluating whether the corresponding predetermined condition is satisfied.

13. The mobile radio claim 1, wherein the predetermined condition includes the measured radio-related parameter entering or leaving a predetermined parameter range.

14. The mobile radio in claim 1, further electronically enabled to:
    prevent the sending of a report associated with the one or more cells even though the predetermined condition is satisfied.

15. The mobile radio in claim 1, wherein the predetermined condition includes the measured radio-related parameter for a first cell becoming better than the measured radio-related parameter for a second cell.

16. The mobile radio in claim 15, wherein the measured radio-related parameters for the first and second cells are both within a predetermined range.

17. The mobile radio in claim 1, electronically enabled to:
    employ a hysteresis parameter in determining whether a predetermined condition is satisfied.

18. The mobile radio in claim 1, wherein the predetermined condition includes a change in the measured radio-related parameter exceeding a change threshold.

19. The mobile radio in claim 1, wherein the predetermined condition includes a problem detected on a radio link with one of the cells.

20. The mobile radio in claim 1, wherein the power control includes a handover operation.

21. The mobile radio in claim 1, wherein the power control includes a change in the bit rate in a transmission involving the mobile radio.

22. A mobile radio, for use in a mobile radio communications system including plural mobile stations communicating with a radio access network having plural cell areas, electronically enabled to perform the following operations including:
    measure a radio-related parameter for one or more cells;
    evaluate the measured radio-related parameter for the one or more cells with respect to a predetermined condition and determine that the predetermined condition is satisfied; and
    report to the radio access network the determination for purposes of handover control or power control;
    wherein the radio-related parameter is a traffic volume associated with the one or more cells.

23. A mobile radio, for use in a mobile radio communications system including plural mobile stations communicating with a radio access network having plural cell areas, electronically enabled to perform the following operations including:
    measure a radio-related parameter for one or more cells;
    evaluate the measured radio-related parameter for the one or more cells with respect to a predetermined condition and determine that the predetermined condition is satisfied; and
    report to the radio access network the determination for purposes of handover control or power control;
    further electronically enabled to:
    prevent the measured radio-related parameter for a specific cell within a predetermined parameter range from affecting the predetermined parameter range.

24. A mobile radio, for use in a mobile radio communications system including plural mobile stations communicating with a radio access network having plural cell areas, electronically enabled to perform the following operations including:
    measure a radio-related parameter for one or more cells;
    evaluate the measured radio-related parameter for the one or more cells with respect to a predetermined condition and determine that the predetermined condition is satisfied; and
    report to the radio access network the determination for purposes of handover control or power control,
    wherein the mobile radio is further electronically enabled to:
    evaluate one or more measured radio-related parameters with respect to two predetermined conditions; and
    send a report of the measured radio-related parameters to the radio access network if both of the two predetermined conditions are satisfied.

25. A mobile radio, for use in a mobile radio communications system including plural mobile stations communicating with a radio access network having plural cell areas, electronically enabled to perform the following operations including:
    measure a radio-related parameter for one or more cells;
    evaluate the measured radio-related parameter for the one or more cells with respect to a predetermined condition and determine that the predetermined condition is satisfied; and
    report to the radio access network the determination for purposes of handover control or power control,
    wherein the mobile radio is further electronically enabled to:
    consider a time-to-trigger in determining whether the predetermined condition is satisfied.

26. A mobile radio, for use in a mobile radio communications system including plural mobile stations communicating with a radio access network having plural cell areas, electronically enabled to perform the following operations including:
measure a radio-related parameter for one or more cells;
evaluate the measured radio-related parameter for the one or more cells with respect to a predetermined condition and determine that the predetermined condition is satisfied; and
report to the radio access network the determination for purposes of handover control or power control,
wherein the predetermined condition is a transmit power of the mobile radio crossing a threshold value.

27. A mobile radio, for use in a mobile radio communications system including plural mobile stations communicating with a radio access network having plural cell areas, electronically enabled to perform the following operations including:
measure a radio-related parameter for one or more cells;
evaluate the measured radio-related parameter for the one or more cells with respect to a predetermined condition and determine that the predetermined condition is satisfied; and
report to the radio access network the determination for purposes of handover control or power control,
wherein the predetermined condition is the mobile radio failing to decrease or increase its transmit power on demand.

28. A mobile radio, for use in a mobile radio communications system including plural mobile stations communicating with a radio access network having plural cell areas, electronically enabled to perform the following operations including:
measure a radio-related parameter for one or more cells;
evaluate the measured radio-related parameter for the one or more cells with respect to a predetermined condition and determine that the predetermined condition is satisfied; and
report to the radio access network the determination for purposes of handover control or power control,
wherein the predetermined condition includes saturation of the mobile radio receiver.

29. A mobile radio, for use in a mobile radio communications system including plural mobile stations communicating with a radio access network having plural cell areas, electronically enabled to perform the following operations including:
measure a radio-related parameter for one or more cells;
evaluate the measured radio-related parameter for the one or more cells with respect to a predetermined condition and determine that the predetermined condition is satisfied; and
report to the radio access network the determination for purposes of handover control or power control,
wherein the mobile radio is electronically enabled to:
send a report to the radio access network with mandatory information associated with the condition and optional additional information not necessarily associated with the predetermined condition.

30. In a mobile radio communications network including plural cells each associated with a radio base station for communicating over a radio interface with mobile stations, a method implemented in a control node in the mobile radio communications network comprising:
instructing a mobile station to measure a radio-related parameter for one or more cells, to evaluate the measured radio-related parameter for each of the one or more cells with respect to an event, and to send a report from the mobile radio to the control node when the event occurs for one or more cells, wherein the measurement information includes a positive or a negative offset to be added to the measured radio-related parameter before the mobile station evaluates whether the event is satisfied;
receiving a report from the mobile station; and
determining whether to perform one of a handover and a power control operation based on the received report.

31. The method in claim 30, wherein the power control operation includes a handover operation.

32. The method in claim 30, wherein the power control operation includes a change in bit rate in a transmission involving the mobile radio.

33. The method in claim 30, further comprising:
determining whether to perform an operations or maintenance operation.

34. The method in claim 30, further comprising:
determining whether to perform a mobile radio communications network balancing or optimization operation.

35. The method in claim 30, wherein the report includes the measured radio-related parameter.

36. The method in claim 30, wherein the report includes measured parameter values other than the measured radio-related parameter, and the method further comprises:
performing another operation based on the other measured parameter values received in the report.

37. The method in claim 30, wherein the report includes a signal strength or a power of a signal received from a base station at the one or more cells.

38. The method in claim 30, wherein the report includes an interference value, a signal-to-interference ratio, or an error rate associated with a signal received from a base station at the one or more cells.

39. The method in claim 30, wherein the report includes a traffic volume associated with the one or more cells.

40. The method in claim 30, wherein the report includes signal measurements associated with different base station radio channels transmitted at the same frequency.

41. The method in claim 30, wherein the report includes signal measurements associated with different base station radio channels transmitted at different frequencies.

42. The method in claim 30, further comprising:
instructing the mobile station to perform plural measurements;
wherein each measurement is reported independently from other measurements.

43. The method in claim 30, wherein the mobile station measurement instruction is described with one or more general parameters in a measurement control message.

44. The method in claim 43, wherein the measurement control message includes: one or more measurement objects, one or more measurement parameters, and one or more reporting events.

45. The method in claim 44, wherein the measurement control message includes an optional measurement parameter to be included in the measurement control message.

46. The method in claim 43, wherein the measurement control message includes an event reporting range such that the mobile station should send a report when the measured radio-related parameter enters or leaves the event reporting range.

47. The method in claim 43, wherein the measurement control message includes an event reporting range such that the mobile station should send a report when the measured radio-related parameter for a first cell is the same as or close to the measured radio-related parameter for a second cell.

48. The method in claim 30, wherein the positive or negative offset may vary depending on the cell.

49. The method in claim 30, wherein the event includes the measured radio-related parameter for a first cell becoming better than the measured radio-related parameter for a second cell.

50. The method in claim 30, wherein the control node instructs the mobile station to employ a hysteresis parameter in determining whether an event has occurred.

51. The method in claim 30, wherein the event includes a change in the measured radio-related parameter exceeding a change threshold.

52. The method in claim 30, wherein the event includes a problem detected by the mobile station on a radio link with one of the cells.

53. In a mobile radio communications network including plural cells each associated with a radio base station for communicating over a radio interface with mobile stations, a method implemented in a control node in the mobile radio communications network comprising:

instructing a mobile station to measure a radio-related parameter for one or more cells, to evaluate the measured radio-related parameter for each of the one or more cells with respect to an event, and to send a report from the mobile radio to the control node when the event occurs for one or more cells;

receiving a report from the mobile station; and determining whether to perform one of a handover and a power control operation based on the received report, wherein the event includes the measured radio-related parameter moving into or moving out of a predetermined parameter range, and wherein the control node instructs the mobile station to prevent the measured radio-related parameter for a specific cell from affecting the predetermined parameter range.

54. In a mobile radio communications network including plural cells each associated with a radio base station for communicating over a radio interface with mobile stations, a method implemented in a control node in the mobile radio communications network comprising:

instructing a mobile station to measure a radio-related parameter for one or more cells, to evaluate the measured radio-related parameter for each of the one or more cells with respect to an event, and to send a report from the mobile radio to the control node when the event occurs for one or more cells;

receiving a report from the mobile station; and determining whether to perform one of a handover and a power control operation based on the received report;

wherein the control node instructs the mobile station to evaluate one or more measured radio-related parameters with respect to two events, and send a report of the one or more measured radio-related parameters to the control node if both of the two events are satisfied.

55. In a mobile radio communications network including plural cells each associated with a radio base station for communicating over a radio interface with mobile stations, a method implemented in a control node in the mobile radio communications network comprising:

instructing a mobile station to measure a radio-related parameter for one or more cells, to evaluate the measured radio-related parameter for each of the one or more cells with respect to an event, and to send a report from the mobile radio to the control node when the event occurs for one or more cells;

receiving a report from the mobile station; and determining whether to perform one of a handover and a power control operation based on the received report;

wherein the event includes a transmit power of the mobile radio crossing a threshold value.

56. In a mobile radio communications network including plural cells each associated with a radio base station for communicating over a radio interface with mobile stations, a method implemented in a control node in the mobile radio communications network comprising:

instructing a mobile station to measure a radio-related parameter for one or more cells, to evaluate the measured radio-related parameter for each of the one or more cells with respect to an event, and to send a report from the mobile radio to the control node when the event occurs for one or more cells;

receiving a report from the mobile station; and determining whether to perform one of a handover and a power control operation based on the received report;

wherein the event includes the mobile radio failing to decrease or increase its transmit power on demand.

57. In a mobile radio communications network including plural cells each associated with a radio base station for communicating over a radio interface with mobile stations, a method implemented in a control node in the mobile radio communications network comprising:

instructing a mobile station to measure a radio-related parameter for one or more cells, to evaluate the measured radio-related parameter for each of the one or more cells with respect to an event, and to send a report from the mobile radio to the control node when the event occurs for one or more cells;

receiving a report from the mobile station; and determining whether to perform one of a handover and a power control operation based on the received report;

wherein the event includes saturation of the mobile radio receiver.

58. In a mobile radio communications network including plural cells each associated with a radio base station for communicating over a radio interface with mobile stations, a control node in the mobile radio communications network configured to perform the following:

instruct a mobile station to measure a radio related parameter for one or more cells, to evaluate the measured radio-related parameter for each of the one or more cells with respect to an event, and to send a report from the mobile radio to the control node when the event occurs for the one or more cells;

receive a report from the mobile station; and determine whether to perform a power control operation based on the received report, wherein the event is a transmit power of the mobile radio crossing a threshold value.

59. The control node in claim 58, wherein the power control operation includes a handover operation.

60. The control node in claim 58, wherein the power control operation includes a change in bit rate in a transmission involving the mobile radio.

61. The control node in claim 58, wherein the operation includes a mobile radio communications balancing or optimization operation.

62. The control node in claim 58, wherein the report includes a signal strength, power, or interference value, a signal-to-interference ratio, or an error rate associated with a signal received from a base station at the one or more cells.

63. The control node in claim 58, further comprising:
instructing a mobile station to perform plural measurements,
wherein each measurement is reported independently from other measurements.

64. The control node in claim 58, wherein the measurement instruction includes an event report range such that the mobile station should send a report when the measured radio-related parameter enters or leaves the event reporting range.

65. The control node in claim 58, wherein the measurement includes an event reporting range such that the mobile station should send a report when the radio-related parameter for a first cell is the same as or close to the measured radio-related parameter for a second cell.

66. The control node in claim 58, wherein the control node instructs the mobile station to evaluate one or more measured radio-related parameters with respect to two events, and send a report of the one or more measured radio-related parameters to the control node if both of the two events are satisfied.

67. The control node in claim 58, wherein the event includes the measured radio-related parameter for a first cell becoming better than the measured radio-related parameter for a second cell.

68. The control node in claim 58, wherein the control node instructs the mobile station to employ a hysteresis parameter in determining whether an event has occurred.

69. The control node in claim 58, wherein the event includes a change in the measured radio-related parameter exceeding a change threshold.

70. In a mobile radio communications network including plural cells each associated with a radio base station for communicating over a radio interface with mobile stations, a control node in the mobile radio communications network configured to perform the following:
instruct a mobile station to measure a radio related parameter for one or more cells, to evaluate the measured radio-related parameter for each of the one or more cells with respect to an event, and to send a report from the mobile radio to the control node when the event occurs for the one or more cells;
receive a report from the mobile station; and
determine whether to perform a power control operation based on the received report;
wherein the measurement includes a positive or a negative offset to be added to the measured radio-related parameter before the mobile station evaluates whether the event is satisfied.

71. The control node in claim 70, wherein the positive or negative offset may vary depending on the cell.

72. In a mobile radio communications network including plural cells each associated with a radio base station for communicating over a radio interface with mobile stations, a control node in the mobile radio communications network configured to perform the following:
instruct a mobile station to measure a radio related parameter for one or more cells, to evaluate the measured radio-related parameter for each of the one or more cells with respect to an event, and to send a report from the mobile radio to the control node when the event occurs for the one or more cells;
receive a report from the mobile station; and
determine whether to perform a power control operation based on the received report,
wherein the control node instructs the mobile station to consider a time-to-trigger in determining whether an event has occurred.

73. In a mobile radio communications network including plural cells each associated with a radio base station for communicating over a radio interface with mobile stations, a control node in the mobile radio communications network configured to perform the following:
instruct a mobile station to measure a radio related parameter for one or more cells, to evaluate the measured radio-related parameter for each of the one or more cells with respect to an event, and to send a report from the mobile radio to the control node when the event occurs for the one or more cells;
receive a report from the mobile station; and
determine whether to perform a power control operation based on the received report,
wherein the event includes the mobile radio failing to decrease or increase its transmit power on demand.

74. In a mobile radio communications network including plural cells each associated with a radio base station for communicating over a radio interface with mobile stations, a control node in the mobile radio communications network configured to perform the following:
instruct a mobile station to measure a radio related parameter for one or more cells, to evaluate the measured radio-related parameter for each of the one or more cells with respect to an event, and to send a report from the mobile radio to the control node when the event occurs for the one or more cells;
receive a report from the mobile station; and
determine whether to perform a power control operation based on the received report;
wherein the event includes saturation of the mobile radio receiver.

\* \* \* \* \*